Patented Feb. 1, 1949

2,460,627

UNITED STATES PATENT OFFICE 2,460,627

PROCESS FOR THE ISOLATION OF SOYBEAN PROTEIN

Eero O. Erkko, Wilmington, Del., and Richard T. Trelfa, Kalamazoo, Mich., assignors to Hercules Powder Company, Wilmington, Del., a corporation of Delaware No Drawing. Application September 7, 1946, Serial No. 695,546

7 Claims. (Cl. 260—112)

This invention relates to the isolation of protein from soybeans and more particularly to a method of isolating protein from soybean meal comprising removing protein mechanically from the meal at the isoelectric point of the protein, followed by extraction of the fibrous residue under alkaline conditions to remove additional amounts of protein.

One method of isolating protein from soybeans, an acid separation method, involves leaching comminuted oil-free soybean meal with water at the isoelectric point of the protein, wet buhring and screening the resulting mixture to effect a separation of protein particles from the fibrous, nonproteinaceous material and recovering the protein from the screened liquor. The acid separation process has the advantage of being inexpensive, inasmuch as it does not require the use of large amounts of chemicals nor of expensive processing and purifying equipment; in addition, the acid separation gives a product which is not excessively denatured and one which consequently has properties approaching those of the naturally-occurring protein. However, the product obtained from the acid separation method generally has the disadvantage, among others, of high viscosity in the alkaline solutions used as the basis of paper coating mixtures and the like. To overcome this high viscosity, the protein may be hydrolyzed; this step, however, requires the use of large amounts of chemicals, is difficult to carry out, and results in a serious loss of strength and darkening of the product.

Thus, the problem confronting the art was that of discovering an economical method for isolating from soybeans a protein not excessively denatured and relatively inexpensive to produce and, moreover, a protein capable of giving dispersions of good color, high adhesive and cohesive strength and low viscosity in alkaline media.

Now in accordance with the present invention, a soybean meal is subjected to an isoelectric point separation, the tailings from the isoelectric point separation are extracted with a weakly alkaline solution, and the protein in the resulting liquors is precipitated with acid. When the tailings are to be extracted with alkali according to this invention, the customary wet buhring and repeated screening of the meal during the acid separation may be dispensed with, inasmuch as the amount of additional protein separable by these methods will be recovered during the alkaline extraction. The process according to this invention yields a dual product, and the fraction of protein extracted from the tailings may be mixed in selected proportions with the fraction obtained by the acid separation method to give a final product which, when dispersed in alkaline solution, is characterized by high adhesive strength and low viscosity.

In carrying out the invention, oil-free soybean meal is soaked in water acidified to substantially the isoelectric point of the protein therein. The resulting slurry may then be passed through a buhrstone or similar type mill to release a greater proportion of the insolubilized protein from the cell walls of the meal, and the slurry (buhred or unbuhred) is passed over a fine mesh screen with the screen openings of such a size that the protein will pass through while the fibrous residue will not pass through. The fibrous residue is then leached with alkali and the resulting liquor is separated off and treated with acid to precipitate the dispersed protein. The factions of protein slurry thus obtained from the two isolation processes may then be combined wholly or in any desired proportion and the mixture freed from water; alternatively, the fractions may, if desired, be freed from water separately and subsequently mixed in selected proportions.

The following is an example of the present invention, but only for the purpose of illustration and should not be construed as limiting the same.

Example

A slurry was prepared by treating 25 parts of soybean meal with 250 parts of water and the pH of the mixture was lowered to 4.78 by adding sulfuric acid. The acidified slurry was stirred for 25 minutes and passed over a 200-mesh stainless steel screen, using a water spray to facilitate the separation of protein particles from the fibrous portion of the meal. Two hundred forty-two parts of protein-bearing liquor passed through the screen, and upon allowing the protein to settle therefrom and decanting the supernatant liquor, 96 parts of concentrated protein slurry was obtained.

The fibrous tailings which passed over the screen were diluted with water to 264 parts and brought to a pH of 10.2 with sodium hydroxide. This alkaline slurry was screened, as above, with the aid of a water spray to separate the protein-bearing liquor from the insoluble fibrous tailings and the 280 parts of screened liquor thus obtained was purified by centrifuging.

One-third (32 parts) of the protein slurry obtained from the isoelectric point separation was mixed with one-third (93 parts) of the protein extract, and this mixture was heated to 50° C. and brought to a pH of 4.6 with sulfuric acid. The precipitated protein thus obtained was filtered and dried at 54° C. to give a product containing 88.3% protein (protein conversion factor 6.25 based on nitrogen analysis) and amounting to 11.0% of the weight of the meal.

The remainder (two-thirds) of the protein slurry obtained by the isoelectric point separation was filtered and dried at 54° C. to give 3.29 parts of a product containing 88.3% protein, a yield of 14.5% of the original meal.

The remainder (two-thirds) of the proteinaceous alkaline extraction liquor was heated to 50° C., brought to a pH of 4.6 with sulfuric acid, allowed to settle, and the protein filtered. This product upon drying contained protein which amounted to 7.0% by weight of the original meal. Thus the three products contained protein totaling 32.5% by weight of the original meal, which amounted to a 52.4% total recovery of protein.

To demonstrate the advantage of the extraction process a comparison is given of the viscosities of alkaline dispersion of acid-separated protein, protein extracted from the acid separation tailings, and combined acid-separated and alkaline-extracted protein. The three samples were obtained in the manner shown in the example, the mixed product containing the two protein fractions in the same proportions as they were removed from the meal. All three samples were hydrated for 30 minutes and treated with NaOH in the amount of 8% by weight based on the protein to give a dispersion containing 12% protein.

| Product | Stormer Viscosity in Centipoise Using 50-gram Counterweight, Example |
| --- | --- |
| Acid-separated | 3,188 |
| Alkaline-extracted | 104 |
| Mixed products | 157 |

The soybean meal from which the protein was to be extracted according to this invention was obtained by removing the oil from bean meal by means of a solvent such as, for example, hexane, preferably at relatively low temperature. However, the meal resulting from oil extractions at higher temperatures and with other solvents may also be employed, although generally in the case of meals extracted at higher temperatures, the alkaline extraction step must be carried out at higher pH's. The soybean meal may be prepared for the process according to this invention by being leached with water at the isoelectric point to remove soluble constituents, or it may be buhred or ground in wet condition to free the protein from fibrous material to render it more easily separable; however, the leaching or buhring steps are not essential and may be omitted if desired. In any case, the meal is soaked in water and brought to a suitable pH which, in general, is from about 3.5 to about 5.0 and preferably from about 4.3 to about 4.9, and the water-meal slurry is screened, for example, by passing the slurry over a shaking screen effecting the separation of protein with the aid of a spray of water, or by other suitable means.

In the acid separation step the pH may be lowered by addition of any common inorganic or organic acid. The use of sulfurous acid, or $SO_2$ gas, has the advantage of having a bleaching effect and can be used to advantage while other acids, such as sulfuric acid, though less advantageous in some ways, are cheaper and more convenient to use. Alternatively, other methods of acidification may be used.

The total amount of water employed in the screening or separation is from 7 to 100 parts based on one part of meal but preferably not more than 50 parts, to avoid waste of large amounts of water. The screen used to effect the separation by whatever method should be about 60 mesh or finer and preferably finer than 100 mesh since the finer screen results in a protein containing a smaller percentage of impurities.

Subsequent to the screening step the acid separation liquors pass through a settling step to separate the isolated protein from the screened liquor. The settling optionally is facilitated by utilizing increased temperature, in the range, for example, of about 30° C. to 80° C.; the temperature, however, was low enough to avoid excessively denaturing the protein, preferably being in the range between about 35° C. and about 60° C.

The tailings resulting from the screening step are diluted with the desired amount of water and treated with alkali, the amount of alkali varying widely according to the results desired. Thus, at a pH of around 7 a substantially undenatured protein is extracted, while at high pH's the product is denatured, and going further, hydrolyzed to a greater or lesser degree. Accordingly, the extraction pH varies from weakly alkaline to strongly alkaline depending on the extent of denaturation desired; for example, when a slightly denatured product is desired the pH may vary from about 6.0 to about 10.0, and when a more highly denatured product is desired the extracting liquor will be more strongly alkaline and the temperature and time increased, with the more severe treatment resulting in greater denaturation or even hydrolysis.

The temperatures maintained during the alkaline extraction, as well as the time required for the extraction, also depend to a large extent on the degree of denaturation and hydrolysis desired. The temperature varies from about 20° C. to about 100° C. as desired, but preferably is within the range of from about 30°C. to about 60° C. for less denatured protein and over about 50° C. for highly denatured protein, and the extraction time ranges from about ¼ hour to about 4 hours, generally about ½ hour.

The alkaline extraction of tailings resulting from the isoelectric point separation were effected by the addition of common alkalies such as caustic soda, caustic potash, sodium carbonate, ammonia or bases such as weakly alkaline salts and organic bases in optional concentrations, and the alkaline extract precipitated by means of any common acid such as sulfuric or hydrochloric acid, by an acid gas such as sulfur dioxide, by an organic acid such as acetic acid, or by other conventional methods.

The precipitation of protein from the alkaline liquor was carried out by acidifying to a pH from about 3.5 to about 5.0 and preferably within the range of from about 4.3 to about 4.9, the precipitation being carried out most satisfactorily at increased temperatures in the range of about 35° C. to about 60° C.

The fractions of protein slurry resulting from the two steps of the process are combined and dehydrated together or may be isolated separately, as desired. Optionally, the alkaline extractions before precipitation are combined with the protein slurry obtained by the isoelectric point separation, and the pH of the mixture lowered to the desired point by the addition of acid.

The removal of water from the protein fractions, whether these fractions are combined or separate, may be carried out by filtration, centrifuging, spray drying, drying in a current of air, etc., or by means of a volatile organic solvent. The latter method preferably consists of diluting the concentrated protein slurry with a water-soluble alcohol, filtering the mixture and washing with alcohol, the excess alcohol then being evaporated. The drying process is carried out at relatively low temperatures to avoid undesired denaturation and darkening of the protein.

As indicated, the protein slurries obtained by the two methods may be combined either before or after the drying step, and the proportions varied to obtain a product meeting predetermined specifications of viscosity, strength, color, and the like. For example, if the alkaline extraction is carried out under hydrolyzing conditions, the proportion of hydrolyzed material in the final mixture is lower in order to obtain specified viscosity characteristics.

Alternatively, the products of the two fractions of protein might not be combined at all, rather being used separately in fields for which each is particularly suited. In this connection it has been found that the fraction of protein obtained by screening unbuhred soybean meal at the isoelectric point gives dispersions of lower viscosity than does the larger portion of protein obtained from the meal which has been wet buhred. Thus, the present process makes it possible by omission of this buhring step to obtain an acid-separated protein having properties superior to those products previously known. Since the lower yield resulting from this procedure is compensated for by the additional amounts of protein recovered by the alkaline extraction of tailings, no over-all loss results.

The process presented herein makes possible the preparation of two fractions of protein which either combined or used separately give alkaline dispersions of lower viscosity than heretofore known acid-separated protein. These improved products are obtained in higher total yield which may amount to as much as 85% of the recoverable protein, and they are obtained at less cost since during the acid separation step the meal need not be wet buhred nor the screening operation repeated. Also an added economy in the alkaline extraction step results from the fact that the slow and expensive centrifuging of the alkaline extract is either greatly shortened or completely eliminated by the fact that the impurities for the most part are eliminated during the prior acid separation.

The proteins obtained by the present process either separately or combined may be utilized in any of the fields to which soybean protein products are suited, for example, in adhesives, filaments, plastics, paper coating, cold water paints, detergents, and others.

What we claim and desire to protect by Letters Patent is:

1. A process for the isolation of protein from soybeans comprising treating oil-free soybean meal with water substantially at the isoelectric point of said protein, separating protein mechanically from the fibrous portion of said meal and subsequently leaching the fibrous portion with an alkaline aqueous protein solvent, thereby extracting additional amounts of protein.

2. A process for the isolation of protein from soybeans comprising treating oil-free soybean meal with water substantially at the isoelectric point of said protein, screening protein from the fibrous portion of said meal and subsequently leaching the fibrous screenings with an alkaline aqueous protein solvent, thereby extracting additional amounts of protein.

3. A process for the isolation of protein from soybeans comprising treating oil-free soybean meal with water substantially at the isoelectric point of said protein, screening protein from the fibrous portion of said meal and subsequently leaching the fibrous screenings with an alkaline aqueous protein solvent, thereby extracting additional amounts of protein, combining the resulting protein extract with the screening-separated fraction of protein and adjusting the pH of the mixture to the isoelectric point of said proteins.

4. A process for the isolation of protein from soybeans comprising treating oil-free soybean meal with water substantially at the isoelectric point of said protein, screening protein from the fibrous portion of said meal and subsequently leaching the fibrous screenings with an alkaline aqueous protein solvent, thereby extracting additional amounts of protein, precipitating the extracted protein by adjusting the pH to the isoelectric point of the protein and combining the resulting suspension of precipitated protein with the screened fraction of protein.

5. A process for the isolation of protein from soybeans comprising treating oil-free soybean meal with water substantially at the isoelectric point of said protein, screening protein from the fibrous portion of said meal, removing the protein from the screened liquor and drying, leaching the fibrous screenings with an alkaline aqueous protein solvent, thereby extracting additional amounts of protein, precipitating the extracted protein by adjusting the pH substantially to the isoelectric point of said protein, separating the precipitate from the mother liquor, drying and combining the dry screened protein in selected proportions with the dry solvent-extracted protein.

6. A process for the isolation of protein from soybeans comprising treating oil-free soybean meal with water substantially at the isoelectric point of said protein, screening protein from the fibrous portion of said meal, removing the protein from the screened liquor, leaching the fibrous screenings with an alkaline aqueous protein solvent, thereby extracting additional amounts of protein, and subsequently combining in selected proportions the protein material recovered in the screening operation with the protein material recovered in the alkaline aqueous treatment of the fibrous screenings.

7. A process for the isolation of protein from soybeans comprising treating oil-free soybean meal with water substantially at the isoelectric point of said protein, wet buhring said meal, screening the protein from the fibrous portion of said meal and subsequently leaching the fibrous screenings with an alkaline aqueous protein solvent, thereby extracting additional amounts of protein.

EERO O. ERKKO.
RICHARD T. TRELFA.

REFERENCES CITED

The following references are of record in the file of this patent:

UNITED STATES PATENTS

| Number | Name | Date |
| --- | --- | --- |
| 2,238,329 | Julian | Apr. 15, 1941 |
| 2,271,620 | Brier | Feb. 3, 1942 |
| 2,297,685 | Brier | Oct. 6, 1942 |
| 2,331,619 | Morse | Oct. 12, 1943 |